Nov. 1, 1955   E. L. BARCUS   2,722,577
DIRECTION SIGNAL SWITCH

Filed March 1, 1952   3 Sheets-Sheet 1

Inventor
Edward L. Barcus
By Willis, Helwig & Baillio
Attorneys

Nov. 1, 1955          E. L. BARCUS          2,722,577
DIRECTION SIGNAL SWITCH
Filed March 1, 1952          3 Sheets-Sheet 2
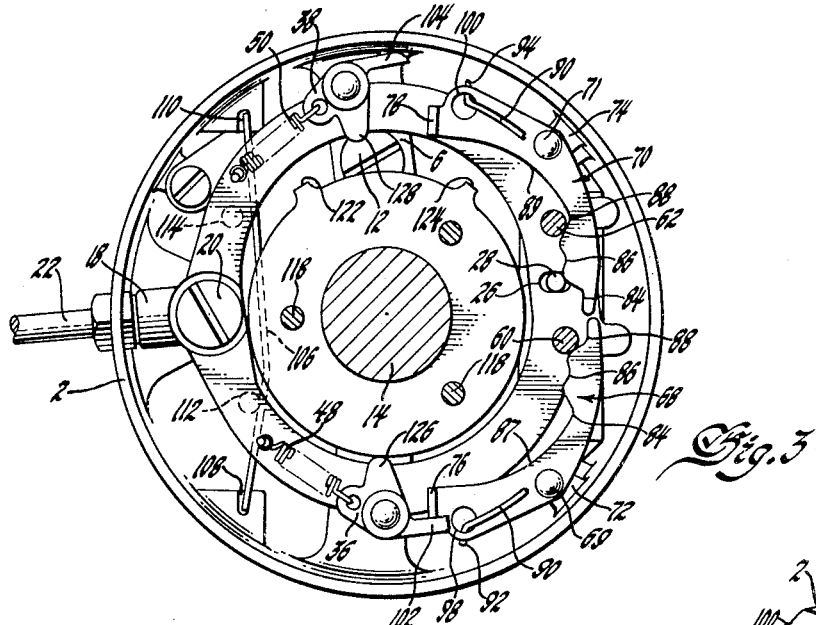
Inventor
Edward L. Barcus
By Willits, Helmig & Baillio
Attorney

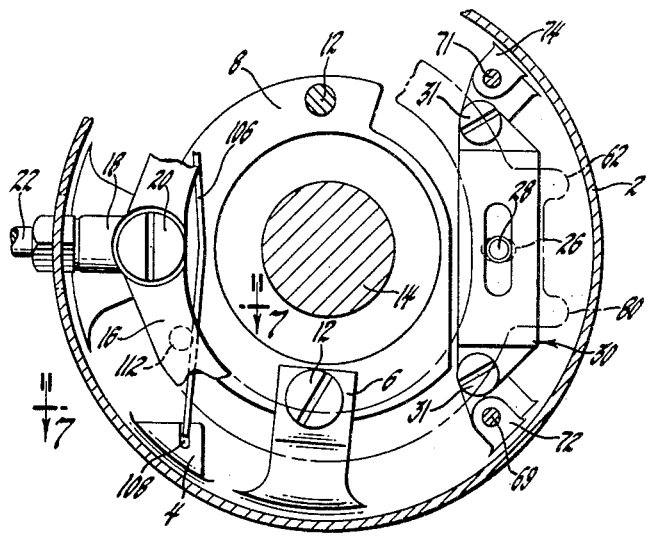

United States Patent Office 2,722,577
Patented Nov. 1, 1955

2,722,577

DIRECTION SIGNAL SWITCH

Edward L. Barcus, Anderson, Ind., assignor to General Motors Corporation, Detroit, Mich., a corporation of Delaware Application March 1, 1952, Serial No. 274,349

13 Claims. (Cl. 200—61.34)

The present invention relates to direction signal control mechanism and particularly to direction signal control mechanisms adapted to be manually set and automatically cancelled.

One object of the present invention is to provide a control mechanism particularly suited for mounting concentrically on the steering column of a motor vehicle in a streamlined compact housing.

Another object is to provide a direction signal control mechanism having means associated therewith for preventing over travel thereof past neutral position when automatically cancelled.

A further object is to provide a control mechanism of the stated character wherein a manually held signal position may be over-ridden by the rotating steering wheel when turned in the opposite direction from the indicated turn without damaging the operating parts thereof.

A still further object is to provide a direction signal mechanism which is simple in construction, economic in manufacture and highly efficient in operation.

These and other objects and advantages are attained by providing a signal control mechanism comprising a yoke assembly mounted in a housing substantially concentric with the steering column and manually and automatically shiftable upon a pivotal mounting in the housing.

For a better understanding of the invention reference may be had to the accompanying drawing in which:

Fig. 3 is a fragmentary plan view, partly in section, similar to Fig. 1, showing the control mechanism in one of its operating positions.

Fig. 4 is a fragmentary plan view of a portion of the housing for the control mechanism, showing the indexing detent members attached thereto.

Fig. 5 is a sectional elevational view taken substantially along line 5—5 of Fig. 1.

Fig. 6 is a plan view, partly in section taken substantially along line 6—6 of Fig. 2.

Fig. 7 is a fragmentary sectional elevational view taken substantially along the line 7—7 of Fig. 6.

Fig. 8 is a fragmentary plan view, partly in section, similar to Fig. 6 but showing an alternative form of electrical switch coupled to the operating yoke, and Fig. 9 is a fragmentary sectional elevational view taken substantially along the line 9—9 of Fig. 8, with parts broken away to more clearly show certain features thereof.

Figure 1:
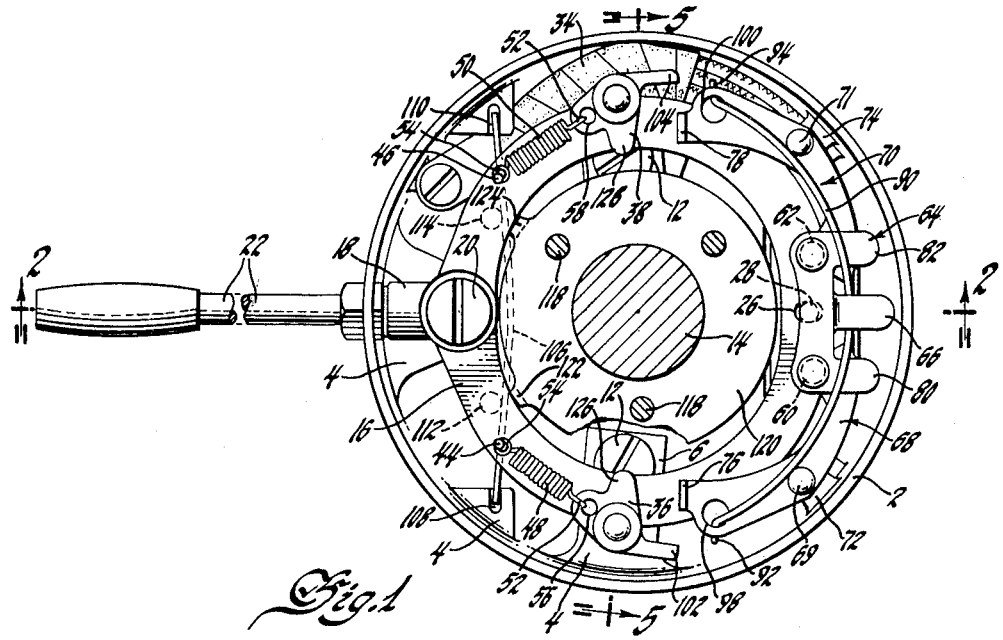
Fig. 1 is a plan view partly in section of the direction signal control mechanism comprising the present invention.

Referring now to the drawings and particularly to Figs. 1, 2, 3, and 5, the numeral 2 designates a housing for the direction signal control mechanism having a web 4 with spaced bosses 6 attached to the flanged end 8 of the steering column 10 by machine screws 12.

Mounted within the housing 2 and substantially concentric with the steering shaft 14 is a die cast ring 16 having an enlarged downwardly offset portion 18 pivotally mounted on a pivot shaft 20 which is threadably engaged with the web 4 of the housing 2. An operating lever 22 passes through an elongated aperture 24 in the housing 2 and is threadably engaged with the enlarged portion 18 of the ring 16 adjacent pivot shaft 20.

At a position substantially diametrically opposed to the operating lever 22 ring 16 is provided with a slightly elongated aperture 26 adapted to receive the operating arm 28 of an electrical switch 30 mounted below the ring 16 on the web 4 of the housing 2, by screws 31. Switch 30 may be of any suitable type, and for a full disclosure one form which said switch may take, reference may be had to the copending application of Lincoln et al., Serial No. 132,180, filed December 9, 1949. The switch operating pin or arm 28 engages terminal blocks adapted to selectively engage multiple contacts 32 of the switch 30 in response to the movement of the ring 16. The contacts 32 are connected to lead wires 34 of the electric circuits for the direction signal system.

In Figs. 8 and 9 there is illustrated an electrical switch assembly 136 of arcuate form which may be used as an alternative to switch assembly 30 hereinbefore described, when a turn signal control housing of minimum diameter is desired. While the bridging members and terminal blocks of both switches are generally similar, switch 136 is provided with a casing 142 attached to the web 4 of housing 2 by screws 144 and 146 and having openings 148 and 150 adjacent its ends through which spaced lugs 138 and 140, secured to ring 16 extend. Lugs 138 and 140 engage the opposite ends of switch casing 142 and operate to actuate the switch elements 152 and 154 slidably mounted in said switch casing to open and close the circuits to the turn signal lamps.

Pivotally mounted on bosses 40 and 42 formed on the upper surface of the ring 16 at opposite sides thereof are a pair of pawls 36 and 38. Substantially midway between the bosses 40 and 42 and the pivot stud 20 for the ring 16 are upwardly extending anchor pins 44 and 46. The pawls 36 and 38 are yieldingly urged to a predetermined neutral position by coil springs 48 and 50, respectively. Springs 48 and 50 have looped ends 52 and 54 which respectively extend into the apertures 56 and 58 of the pawls 36 and 38 and encircle the anchor pins 44 and 46.

Figure 2:
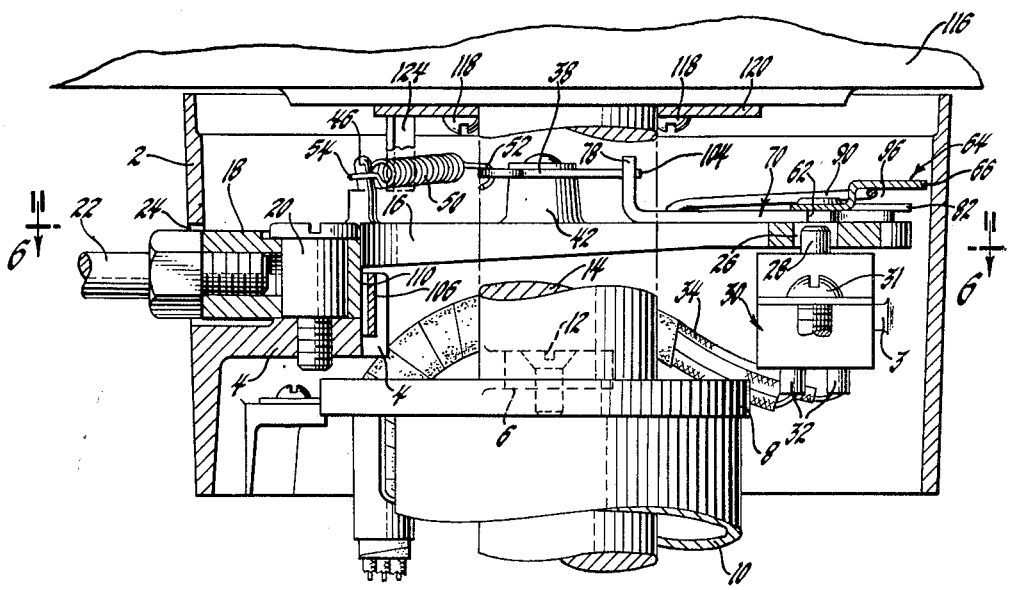
Fig. 2 is an enlarged sectional elevational view of the control mechanism taken substantially along line 2—2 of Fig. 1 and illustrating its position on a vehicle steering column adjacent the steering wheel.

Ring 16 has rigidly secured thereto in spaced relation on either side of aperture 26, a pair of short upstanding pins 60 and 62, as shown more particularly in Fig. 1. An E-shaped guide member 64 having an upwardly offset middle finger 66 is riveted or otherwise secured to the upper ends of pins 60 and 62. A pair of relatively flat, segmental substantially arcuate detent members 68 and 70 are pivotally mounted, as shown at 69 and 71 on spaced bosses 72 and 74, respectively, formed on the web 4 at opposite sides of the housing 2. Detent members 68 and 70 are disposed in a plane between the ring 16 and the lower surfaces of fingers 80 and 82 of the E-shaped member 64, the inner ends of said detent members being guided in the space therebetween, as shown in Figs. 1 and 2. Three notches 84, 86 and 88 formed on the inner edges 87 and 89 of detent members 68 and 70, respectively, near the inner ends thereof are adapted to engage the pins 60 and 62. A wire type spring 90 having hooked ends 92 and 94 extends through the guide space 96 disposed between finger 66 and fingers 80 and 82 of the E-shaped member 64 and is so biased as to enable the said hooked ends 92 and 94 to extend into apertures 98 and 100, respectively, provided in the outer ends of the detent members 68 and 70. Spring 90 thus yieldingly urges the detent members 68 and 70 inwardly into engagement with pins 60 and 62. The notches 86 engage pins 60 and 62 to hold ring 16 and operating lever 22 in neutral position, the notches 84 engage said pins to hold the said ring in the right turn signal position and the notches 88 engage said pins to hold said ring in the left turn signal position.

As shown in Fig. 3, the upturned outer ends 76 and 78 of the detent members 68 and 70 are spaced to alternately engage finger projections 102 and 104 integral with pawls 36 and 38 when the ring 16 is alternately actuated to the left and right hand operating positions. When ring 16 is in its mid or neutral position the upturned ends 76 and 78 of detent members 68 and 70 are out of engagement with the finger projections 102 and 104.

To arrest rotational momentum of the operating ring 16 and to provide a more positive neutral position thereof, a plate type spring 106 is provided. Spring 106 extends transversely of and is disposed below ring 16, and the opposite ends thereof are seated in slots 108 and 110 provided in the web 4 of the housing 2, and disposed at substantially right angles to the operating lever 22 when the latter is in neutral position. Spaced, downwardly depending pins 112 and 114 secured to ring 16 exert equal pressure upon spring 106 when the said ring is in its neutral position. Actuation of the ring 16 to either the right or left operating position from neutral causes increased tensioning of spring 106 by one of the depending pins 112 and 114, thereby dampening momentum and the tendency of the said ring to over travel neutral when it is returned to neutral position. This is apparent since spring 106 is under the least tension when the ring 16 is in neutral position.

Attached to the steering wheel 116 by screws 118 is a circular knockout plate 120 having downwardly depending ears 122 and 124. Depending ears 122 and 124 are free to travel in an unobstructed circular path with the steering wheel 116 when the ring 16 is in its neutral position, as will be seen particularly in Fig. 1. However, when the ring 16 is actuated to its left turn operating position, as shown in Fig. 3, the lobe 126 of the pawl 36 is brought into the rotational path of the depending ears 122 and 124. It is also seen that when ring 16 has been so adjusted, the projecting finger 102 of pawl 36 is brought into engagement with the upturned outer end 76 of the detent member 68, while the pawl 38 is moved outwardly toward housing 2. It will be apparent that when ring 16 is moved in the opposite direction from neutral position the lobe 128 of pawl 38 will be brought into the path of ears 122 and 124 and projective finger 104 will be brought into engagement with upturned end 78 of detent member 70, while pawl 36 will be moved out of the path of said ears.

In order that the operation of the invention may be more clearly understood, let us assume that it is desired to energize the left turn signal. The operator actuates lever 22 in a counterclockwise direction, as shown in Fig. 3, thereby causing the said ring to actuate switch operating pin 28 to its left turn circuit bridging position. Pins 60 and 62 also cam detent members 68 and 70 outwardly against the action of spring 90 until they clear the high points between notch 86 and 88 when the said spring urges the said detent plates against said pins bringing notches 88 into engagement therewith. Lever 22 and ring 16 are now resiliently held in adjusted position. During movement of lever 22 to this position the pawl 36, pivoted on the ring 16, moves inwardly therewith causing the lobe 126 on said pawl to be brought into the rotational path of the downwardly depending ears 122 and 124 of knock out plate 120 and the projecting finger 102 of said pawl to be brought into abutting relation with the upturned outer end 76 of the detent member 68.

As the steering wheel 116 is rotated in a counterclockwise direction to effect the desired turn, the downwardly depending ears 122 and 124 of the knockout plate 120 successively engage the lobe 126 of the pawl 36 causing the pawl to rotate clockwise about its pivot against the action of spring 48 until sufficient clearance has been provided for the depending ears 122 and 124 to pass the said lobe. When the turn is completed and the direction of the steering wheel 116 is reversed to straighten the vehicle either ear 122 or 124, as the case may be, engages the other side of the lobe 126 of pawl 36 causing it to rotate in a counterclockwise direction about its pivot actuating the projecting finger 102 of said pawl inwardly against the upturned outer end 76 of detent member 68 thereby rocking the latter about its pivot 69 and bringing the inner end thereof away from pin 60. As the detent member 68 continues to move in this manner the tension of spring 90 progressively increases until the opposing force of spring 90 substantially balances the lever action of projecting finger 102 against the upturned end 76 of the detent member when further pivotal movement of pawl 36 momentarily ceases. The continued pressure imposed by depending ear 122 or 124 against the lobe 126 of the pawl 36 is now transmitted to ring 16 by the camming action of said ear causing movement of said ring to neutral position. Since the notched inner edge of detent member 68 has been moved out of contact with the index pin 60, as a result of the lever action of projecting finger 102, the pressure of the deflected spring 106 bearing against the depending pin 112 of the ring 16 counteracts the opposing pressure imposed on detent member 70 by spring 90. It is also seen that should the operating lever 22 be forcibly held in the left turn signal operating position during the reverse rotation of the steering wheel 116, the ring 16 will remain stationary and pawl 36 will simply swing a greater distance about its pivot until ear 122 or 124 moves clear thereof. Where the depending ears 122 and 124 successively displace and pass the lobe 126 of the pawl 36, the upturned end 76 of the detent member 68, urged by the spring 90, bears against the projecting finger 102 reversely rotating the pawl 36 to its normal position. It will therefore be apparent that the mechanism will not be damaged or the steering wheel locked by forcibly retaining a direction signal operating position contrary to the rotation of the steering wheel.

In order to energize the right turn signal, lever 22 is actuated in a clockwise direction, thereby bringing the lobe 128 of pawl 38 into the path of movement of ears 122 and 124 and moving pawl 36 farther out of the path thereof. At the same time projecting finger 104 of pawl 38 is brought into engagement with the upturned end 78 of detent member 70. Switch operating pin 28 is also actuated by ring 16 causing adjustment of the switch so as to energize the right turn signal lamps. Pins 60 and 62 during this movement of the ring 16 cam detent members 68 and 70 outwardly against the action of spring 90 until they clear the high points between notches 86 and 84 when the said spring urges said detent plates against the pins opposite notches 84. Lever 22 and ring 16 are now resiliently held in adjusted position. As the steering wheel is now rotated in a clockwise direction to turn the vehicle to the right, the ears 122 and 124 of knockout plate 120 successively engage the lobe 128 of pawl 38 causing the latter to rotate in a counterclockwise direction about its pivot against the action of spring 50 until the said ears move past said pawl. When the turn has been completed and the steering wheel is turned in the opposite direction to straighten the vehicle, ear 124 or 122, as the case may be, engages the other side of the lobe 128 of pawl 38 causing it to rotate in a clockwise direction about its pivot, thus swinging finger 102 inwardly which in turn rocks detent member 70 in a counterclockwise direction against the action of spring 90. The inner notched end of detent member 70 now moves out of engagement with pin 62. As detent member 70 continues to move in this manner the tension of spring 90 progressively increases, as in the previous case, until the force thereof substantially balances the lever action of finger 104 against the upturned end 78 of said detent member, when further pivotal movement of pawl 38 ceases. As movement of ear 124 or 122 continues, the force thereof now operates to move ring 16 to neutral position. Inasmuch as the notched inner end of detent member 70 has been moved out of engagement with pin 62 by the action of pawl 38 as just described, the pressure of deflected spring 106 on pin 112 of ring 16 counteracts the opposing pressure exerted on detent member 68 by spring 90. It is also apparent, as in the case of the operation of lever 22 to energize the left turn signal, that should lever 22 now be forcibly restrained in the right turn signal position during movement of the steering wheel to straighten the vehicle after a right turn has been effected, ring 16 will remain stationary and pawl 38 will simply swing about its pivot in a clockwise direction a greater distance until ear 124 or 122 clears the lobe 128 thereof. As the depending ears 122 and 124 successively move past pawl 38, the upturned end 78 of detent member 68 urged by spring 90 bears against finger 104 thereby reversely rotating the said pawl to its normal position as shown in Fig. 1.

Damage to the operating parts as well as binding of the steering will therefore be prevented in the event that lever 22 is forcibly restrained in either the right turn or left turn positions thereof against the operation of the steering wheel.

It will be apparent to those skilled in the art that the devices illustrated are subject to further modification and change without departing from the spirit of the invention. It therefore is to be understood that it is not intended to limit the invention to the embodiments shown and described herein but only by the scope of the claims which follow.

I claim:

1. In combination, a switch movable from an open neutral position to circuit closing positions at opposite sides of said neutral position, an operating member movable to different positions of adjustment for actuating said switch, a fixed support, pivot means for mounting said operating member on said support, and a pair of spring urged detent arms pivotally mounted on said support for retaining said operating member in its adjusted positions.

2. In combination, a switch movable from an open neutral position to circuit closing positions at opposite sides of said neutral position, an operating member movable to different positions of adjustment for actuating said switch, a fixed support, pivot means for mounting said operating member on said support, a pair of pivotal detent members mounted on said support, each of said members having a plurality of notches thereon, means on said operating member adapted to be engaged by said notches, and spring means operatively connected to said detent means for yieldably urging the latter into engagement with said means on said operating member.

3. In combination, a switch movable from an open neutral position to circuit closing positions at opposite sides of said neutral position, an operating member for said switch, a fixed support, pivot means for mounting said operating member on said support, a pair of pivotally mounted detent plates having notched inner edges, and a pair of indexing pins attached to said operating member and adapted to engage said notched inner edges of said detent means to retain said member in adjusted position.

4. In a device of the class described, the combination of a switch movable from an open neutral position to circuit closing positions at opposite sides of said neutral position, an operating member movable to different positions of adjustment for actuating said switch, a fixed support, means for pivotally mounting said operating member on said support, a pair of pawls pivotally mounted on said member at opposite sides of the latter, said pawls being yieldably rotatable in either direction from normally centered positions, steering means, and knockout means operable with said steering means and adapted to engage one of said pawls when said operating member has been moved to one position of adjustment and to engage the other said pawl when said operating member has been moved to another position of adjustment.

5. In a device of the class described, the combination of a switch movable from an open neutral position to circuit closing positions at opposite sides of said neutral position, an operating ring for said switch, a fixed support, means for pivotally mounting said ring on said support, a pair of pawls pivotally mounted on said ring at opposite sides thereof, said pawls being yieldably rotatable in either direction, steering means, knockout means operable with said steering means and adapted to engage one of said pawls when said operating ring has been moved to one position and to engage the other said pawl when said member has been moved to another position, and yieldable detent means pivotally mounted on said support for yieldably holding said operating ring in different positions of adjustment.

6. In a device of the class described, the combination of a switch movable from an open neutral position to circuit closing positions at opposite sides of said neutral position, an operating ring movable from a neutral position to operating positions at either side of neutral position for actuating said switch, a fixed support, pivot means for mounting said ring on said support, a pair of pawls pivotally mounted on said ring at opposite sides thereof, said pawls being yieldably rotatable in either direction, steering means, knockout means operable with said steering means and adapted to engage one of said pawls when said operating ring has been moved to one position and to engage the other said pawl when said ring has been moved to the other position from said neutral position, yieldable detent means pivotally supported on said support for yieldably holding said operating ring in different positions of adjustment, and means on said detent means engaging one of said pawls when said ring is moved to one of said operating positions and additional means on said detent means for engaging the other of said pawls when said ring is moved to the other of said operating positions.

7. In a device of the class described, the combination of a switch movable from an open neutral position to circuit closing positions at opposite sides of said neutral position, an operating ring movable from a neutral position to operating positions at either side of said neutral position for actuating said switch, a fixed support, pivot means for mounting said operating ring member on said support, a pair of pawls pivotally mounted on said ring at opposite sides thereof, said pawls being yieldably rotatable in either direction, steering means, knockout means operable with said steering means adapted to engage one of said pawls when said operating ring has been moved to one position from said neutral position and to engage the other said pawl when said ring has been moved to the other position from neutral, yieldable detent means pivotally supported on said support for yieldably holding said operating ring in different positions of adjustment, and means on said detent means adapted to yieldably resist rotation of said pawls in one direction when said ring is moved to one of said operating positions and to yieldably resist rotation of said pawls in the other direction when said ring is moved to the other of said operating positions.

8. In combination, a switch movable from an open neutral position to circuit closing positions at opposite sides of said neutral position, an operating member for said switch, a fixed support, detent means pivotally mounted on said support, said detent means comprising a pair of elongated substantially flat members having notches provided in the inner edges thereof, a pair of indexing pins attached to said operating member and adapted to engage said notches, to retain said member in adjusted positions, a pair of pawls pivotally mounted on said member at opposite sides thereof, means associated with said pawls for yieldably resisting rotation thereof in either direction, steering means, knockout means on said steering means, said knockout means being adapted to engage either of said pawls to return said operating member and switch to neutral position after operation thereof to switch closing position, and spring means yieldably centering said operating member between the limits of its movement.

9. In combination, a switch movable from an open neutral position to circuit closing positions at opposite sides of said neutral position, an operating member movable from a neutral position to positions at either side of said neutral position for actuating said switch, a fixed support, pivot means for mounting said member on said support, detent means pivotally mounted on said support, said detent means comprising a pair of generally arcuate plates having notches at the inner edges thereof, a pair of indexing pins attached to said operating member and adapted to engage said notches to retain said member in adjusted positions, a pair of pawls pivotally mounted on said ring at opposite sides thereof, means associated with said pawls for yieldably resisting rotation thereof in either direction, steering means, knockout means on said steering means, said knockout means being adapted to engage either of said pawls to return said operating member to neutral position after operation thereof to switch closing position, and spring means for yieldably centering said operating member between the limits of its movement, said spring means comprising a flat spring attached to said support, and lug means on said operating member engaging said spring.

10. In combination, a switch movable from an open neutral position to circuit closing positions at opposite sides of said neutral position, a fixed support, an operating member for said switch pivotally mounted on said support and movable from a neutral position to operative positions on either side of said neutral position, a pair of substantially arcuate segmental detent members pivotally mounted intermediate the ends thereof on said support, said detent members having notches provided near one end of the inner edges thereof, a pair of upstanding indexing pins attached to said operating member, a spring biased between said detent members urging said notches into yielding engagement with said indexing pins to retain said operating member in adjusted positions, steering means, knockout means on said steering means, a pair of pawls pivotally mounted on said operating member at opposite sides thereof, said pawls being adapted to yieldably intersect the rotational path of said knockout means when said operating member is moved to its different positions of adjustment, projections formed on said pawls, upturned ends formed on said pair of detent members adapted to engage the said projection on one of said pawls when said operating member is moved to one operating position and to engage the projection on the other of said pawls when said operating member is moved to the other operating position, to yieldably resist rotation of said pawls in one direction, a plate spring attached to said support, and depending lugs on said operating member adapted to deflect said plate spring when said operating member is moved from the neutral position to either of said operating positions.

11. In a device of the class described, the combination of a housing, a rotatable member mounted adjacent said housing, knockout means attached to said rotatable member, an operating ring pivotally mounted in said housing and movable to operating positions on either side of a neutral position, rotatable pawls oppositely disposed on said ring and engageable by said knockout means when said ring is moved to one of its operating positions, spring means on said ring adapted to yieldably resist rotation of said pawls in either direction, a pair of pivotal detent members yieldably retaining said ring in a plurality of positions, an electrical switch mounted in said housing, and an operating member connecting said switch to said ring.

12. In a device of the class described, the combination of a steering wheel having lugs depending therefrom, a housing having a slot therein, a ring pivotally mounted in said housing adapted for shiftable movement from neutral to operating positions at opposite sides of said neutral position, an operating lever attached to said ring and extending outwardly through said slot in said housing, oppositely disposed pawls pivotally mounted on said ring, one of said pawls being adapted to be engaged by said lugs when said ring is in one of its operating positions, the other of said pawls being adapted to be engaged by said lugs when said ring is moved to its other operating position, spaced anchor pins formed on said ring, springs attached to said anchor pins adapted to yieldably resist rotation of said pawls in either direction, spring means attached to said housing adapted to yieldingly center said ring between the limits of its shiftable movement, an electrical switch mounted in said housing, and an operating member on said switch adapted for engagement by said ring upon movement of the latter to its operating positions to actuate said switch.

13. In a device of the class described, the combination of a steering column, a steering shaft having a steering wheel with spaced depending ears attached thereto, a substantially cylindrical housing attached to said steering column below said steering wheel and surrounding said depending ears, said housing being formed with a web and having an elongated aperture in its wall, an operating ring pivotally mounted in said housing and movable to a plurality of operating positions, an operating lever attached to said ring and extending outwardly through said aperture in said housing for manual positioning of said ring, a pair of pawls pivotally mounted on said ring, one of said pawls being adapted to yieldably intersect the rotational movement of said depending ears when said ring is in one operating position, the other of said pawls being adapted to yieldably intersect the rotational movement of said depending ears when said ring is in the other of its operating positions, a pair of spring urged pivotal detent members with notched inner edges, a pair of upstanding indexing pins attached to said ring, said pins being adapted to engage said notched inner edges of said detent members to yieldably restrain said ring in three defined positions of adjustment, and an electrical switch mounted in said housing, said switch having a slidable circuit bridging member, and means operatively connecting said bridging member to said operating ring.

References Cited in the file of this patent

UNITED STATES PATENTS

| | | |
|---|---|---|
| 2,226,082 | Thirlwell | Dec. 24, 1940 |
| 2,291,141 | Breeze | July 28, 1942 |